April 6, 1937.  A. W. LEMMON  2,076,239
TROLLEY ROLLER
Filed Sept. 12, 1934
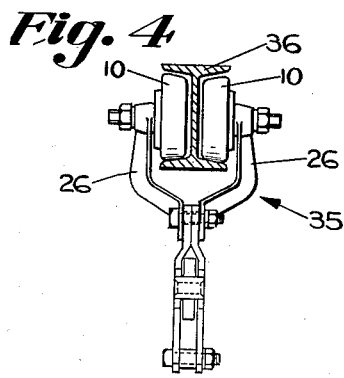
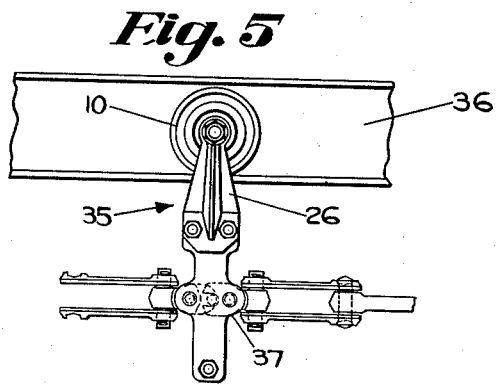
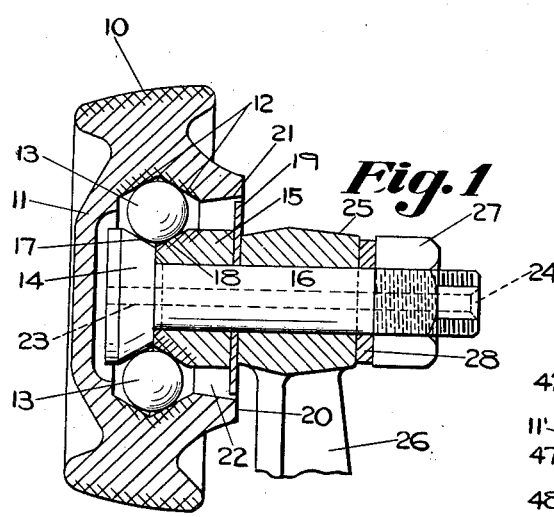
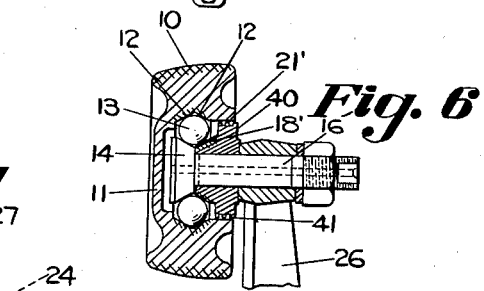
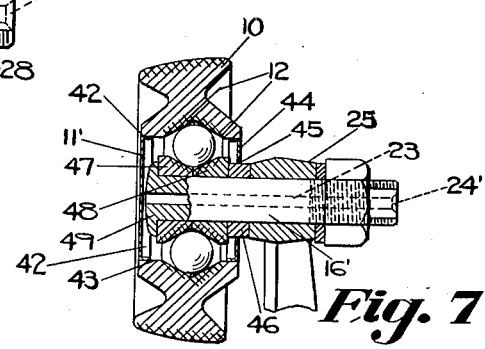
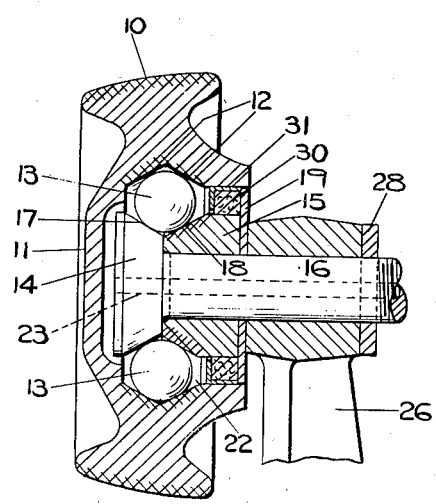
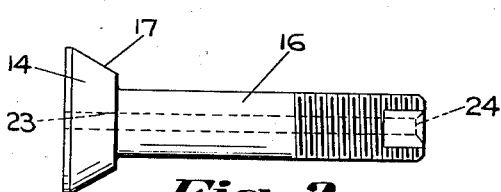
INVENTOR:
Alexis W. Lemmon
By
Chas. M. Nissen,
ATTY Patented Apr. 6, 1937

2,076,239

UNITED STATES PATENT OFFICE 2,076,239

TROLLEY ROLLER

Alexis W. Lemmon, Columbus, Ohio, assignor to The Jeffrey Manufacturing Company, a corporation of Ohio Application September 12, 1934, Serial No. 743,737

9 Claims. (Cl. 308—190)

This invention relates to trolley conveyors and particularly to a roller assembly for a trolley conveyor.

An object of the invention is to provide a non-friction bearing type of trolley roller assembly in which the bearing surfaces are protected from harmful elements.

Another object of the invention is to provide a trolley roller assembly which has a minimum number of parts which parts are easily assembled and disassembled without mutilating any of the parts, and which provide a rigid unit.

Another object of the invention is to provide an improved trolley roller assembly which provides for easy adjustment to compensate for any wear of a bearing surface thereof.

Another object of the invention is to provide a trolley roller assembly in which the bearing surfaces are effectively protected by being encased and are all case hardened to prolong the life thereof.

Still another object of the invention is to provide a ball bearing trolley roller assembly in which the inner bearing race is a two piece member and which is so formed as to provide a two point contact with any ball bearing thereof.

Other objects of the invention will appear hereinafter, the novel features and combinations being set forth in the appended claims.

In the accompanying drawing,

Fig. 1 is a view of the trolley roller assembly along the axis of rotation thereof, with some parts shown in section;

Fig. 2 is a view similar to Fig. 1, with some details omitted, showing a trolley roller assembly provided with a retaining felt washer;

Fig. 3 shows the axle bolt of Figs. 1 and 2;

Fig. 4 is an end view of a trolley roller assembly including the hanger and runway, the latter being shown in section;

Fig. 5 is an elevational view of the assembly of Fig. 4;

Fig. 6 is a modification of my invention, certain parts being shown in section; and Fig. 7 is another modification of my invention, certain parts being shown in section.

The trolley roller assembly comprising my invention, as illustrated in Fig. 1, comprises the roller 10, provided with an integral recess closing cap 11. Said roller 10 and its integral cap 11 are preferably formed by drop forging, though they may be formed in other well known ways. The inner peripheral wall of the roller 10 is properly grooved to provide the outer race comprising bearing surfaces 12. Said bearing surfaces are preferably substantially conical surfaces intersecting at an angle in a plane parallel to their axes, as illustrated, but said groove may be formed of other shapes, for example, it may be arcuate, as viewed on an axial section, and be formed on the arc of a circle slightly larger than the diameter of ball bearings 13. A race formed by intersecting conical surfaces has the advantage over one formed on an arc in that it provides two point contact between said outer race and said ball bearings, thus maintaining friction at a minimum. By making the outer race of intersecting conical surfaces, or of arcuate shape, as viewed on an axial section, the ball bearings not only carry the load in a vertical direction but properly align the roller 10 axially, thereby preventing contact between friction developing surfaces.

The inner race of said assembly upon which ball bearings 13 are adapted to ride consists of two parts comprising cones 14 and 15. The outer or head cone 14 may constitute the head of the axle bolt 16 and in the species of Fig. 1 it is formed integral therewith. This may be done, for example, by a drop forging process, though other well known methods may be employed. The inner or tail cone 15 comprises a sleeve adapted to fit over the shank of axle bolt 16 and abut against the bottom of head cone 14. As is seen from Fig. 1, head cone 14 is provided with the race surface 17, and sleeve cone 15 is provided with race surface 18, said race surfaces 17 and 18 preferably comprising conical surfaces intersecting on a circle at the point of contact of the bottom of head cone 14 and the top of sleeve cone 15. Said bearing surfaces 17 and 18, as viewed on an axial section, form a substantially V-shaped or grooved inner race. Such an inner race bearing is preferred over surfaces other than conical. For example, it is preferred over a surface formed to provide an arcuate groove, for conical surfaces provide a minimum of friction by virtue of the two point contact with each of the ball bearings 13. The ball bearings 13 being held between the race surfaces 12, 17 and 18, properly align and maintain the roller 10 relative to the axle bolt 16 and prevent any appreciable axial movement of said roller 10 with respect to said axle bolt 16, which if allowed might cause undesirable friction between non-friction surfaces of the assembly.

One important feature of my invention resides in the two piece construction of the inner race comprising the head cone 14 and sleeve cone 15, whereby any wearing of the bearing surfaces may be easily compensated for by grinding the top of the sleeve cone 15. By this simple expedient the entire assembly may be kept rigid at all times but, of course, allowing free rotation of roller 10.

A retaining washer 19 is provided to fit over the axle bolt 16 and rest against the bottom of sleeve cone 15, the outer face thereof being in substantial alignment with the face 20 of roller 10, and the outer peripheral edge thereof being slightly spaced from the inner peripheral surface 21 of said roller 10. For most purposes this retaining washer 19 is sufficiently effective to retain the lubricating fluid in the lubrication chamber 22 of said assembly, and to prevent the entrance of foreign matter into said chamber. The lubricating fluid, which may be a light grease, is supplied to the chamber 22 through the opening 23 in the axle bolt 16. This opening terminates in an enlargement 24 comprising a well-known type of grease fitting. The lubricating fluid upon being applied under pressure at fitting 24 progresses through opening 23 passing out at the head 14. It is there deflected by wall 11 and moves back toward retaining washer 19, completely filling the interstices between the ball bearings 13 and the bearing surfaces 12, 17 and 18. This new lubricating fluid will clean the bearing surfaces and force old grease and dirt out through the small clearance between washer 19 and surface 21, also forming a seal at the clearance.

Axle bolt 16 passes through the hub 25 of hanger 26 and is rigidly fastened thereto by nut 27 and lock washer 28.

When nut 27 is drawn home, the sleeve 15 and retaining washer 19 are rigidly clamped between the inner face of hub 25 and the inner end of head cone 14, thereby providing a rigid assembly of these parts. Inner race surfaces 17 and 18 and outer race surfaces 12 cooperate with ball bearings 13 to align and support properly roller wheel 10 on axle bolt 16.

To assemble the device, head 14 of bolt 16 is first placed in chamber 22. The balls 13 are then placed in chamber 22, these balls being individual and not carried in any cage structure; such cage structure being eliminated by this assembly. Sleeve cone 15 is then placed over axle bolt 16 and moved into position. Retaining ring 19 is then placed over bolt 16 and moved to position, after which bolt 16 is inserted into hub 25 and locked rigid by nut 27 and lock washer 28. Disassembly of the device is accomplished by a reverse procedure.

All of the elements of my assembly which are subject to any wear are preferably case hardened. This comprises the roller 10, including the outer roller surface and the race surfaces 12; the axle bolt 16, including the head 14 and race surface 17; the sleeve cone 15 including the race surface 18 and the ball bearings 13.

Fig. 2 shows substantially the same structure as is shown in Fig. 1 except a felt packing serving as a retaining washer 30 with a metal backing or gland 31 has been added to supplement the action of washer 19. Said backing or gland 31 is in frictional engagement with the roller 10 and rotates therewith. A slight clearance is provided between the inwardly extending flange thereof and the sleeve cone 15. Where the service is severe it may be desirable to employ said metal backed felt washer 30 in addition to retaining washer 19.

Figs. 4 and 5 illustrate one application of my trolley roller assembly. As here applied, two of said assemblies are oppositely disposed on a Y-shaped hanger 35, the rollers riding on the oppositely disposed faces of an I-beam type of runway 36. The hanger 35 is, of course, connected to a chain of the usual type through link 37. It is obvious, however, that my roller assembly may be applied to other well known types of hangers and other well known types of runways.

I have illustrated in Fig. 6 a modification of my invention. This species is essentially the same in construction as that of Fig. 1 except for the elimination of retaining washer 19 and the substitution therefor of a retaining seal formed separately or integral with the inner race sleeve. Said combined inner race sleeve and retaining seal carries the conical race surface 18' and an integral circumferential ring 40. The periphery of said circumferential ring 40 extends into close relation with the inner peripheral surface 21' of the roller wheel 10 which surface is preferably cylindrical rather than conical, as it was in Fig. 1. Said ring 21' is also preferably provided with one or more circumferential grooves 41 which render more effective the sealing action of said ring 21'.

Fig. 7 illustrates another modification of my invention which differs from the species of Fig. 1 in several respects. Instead of the integral closing cap 11 of Fig. 1, I have provided a removable closing cap 11' which may be a metal stamping with a peripheral flange 42 which is held by friction to the inner peripheral surface 43 of roller 10. This removable cap provides for easier machining of the race surfaces 12 by making them more accessible during the machining operation.

The retaining ring structure of the species of Fig. 7 also differs from that of either Fig. 1 or 6. Said retaining ring structure comprises a cap member 44 somewhat similar to cap 11' except that it is provided with a circular opening 45 and is slightly spaced from a spacing washer 46. Said washer 46 is somewhat thicker than retaining washer 19 of Fig. 1 but is of smaller external diameter. The retaining ring 44 is carried by the roller 10 in a manner similar to that by which cap 11' is carried thereby. If desired, a felt washer may be placed back of ring 44.

The axle bolt and inner race structure is also different in the species of Fig. 7 from that of Fig. 1 or 6. In this species two substantially similar inner race sleeve cones 47 and 48 are provided. The head race cone 47 slides over the shank of axle bolt 16' and at its outer end abuts the head 49 of said bolt 16'. The tail race cone 48 slides over axle bolt 16' in substantially the same manner that inner race sleeve 15 fits over axle bolt 16 in Fig. 1.

The two race cones 47 and 48 and the spacing washer 46 are rigidly clamped between the head 49 of axle bolt 16' and hub 25 as shown in Fig. 7. The two race cones 47 and 48 being similar, adjustment for wear is provided by the grinding of the adjacent surfaces of either or both of them. Furthermore, the removability of each of these cones provides for the renewal of the inner race surfaces without requiring a new axle bolt. Said axle bolt 16' is provided with the usual lubrication openings, as 23' and 24'. The roller 10 and race cones 47 and 48 are preferably case hardened in each of the species shown, at the outer rolling surfaces and at the race surfaces 12, 12.

It is to be understood that the specific axle bolt and inner race cones of Fig. 7 are not limited to this specific species of my invention, but may be employed with the roller with an integral cap as illustrated at 11 in Fig. 1. It is also to be understood that the rollers 10 of Figs. 1, 2 and 6 need not have the integral cap 11 but may be provided with a removable cap like 11' of Fig. 7, and/or a removable closure like 44 thereof.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a trolley roller assembly, the combination with a trolley roller having an axial recess opening at one side thereof and forming an outer race, of an inner race comprising a pair of separable cones, non-friction bearing means carried between said inner and outer races, and means for substantially closing said recess opening comprising a ring integral with one of said separable cones.

2. In a trolley roller assembly, the combination with a roller having an axial recess open at one side thereof which recess is closed by an integral wall at the other side, of an inner race comprising a pair of separable cones, non-friction bearing means carried between said inner race and said roller, and means for substantially closing said recess opening comprising a ring integral with one of said separable cones.

3. In a trolley roller assembly, the combination with a trolley roller having an axial recess opening at one side thereof and forming an outer race, of an inner race comprising a pair of separable cones, non-friction bearing means carried between said inner and said outer races, and means for substantially closing said recess opening comprising a ring formed rigid with one of said cones, said ring being provided at its peripheral surface with one or more peripheral grooves.

4. In a trolley roller assembly, the combination with a trolley wheel having an axial recess forming an inner peripheral grooved bearing surface providing an outer race, of an axle for said roller extending into said recess, a pair of cones on said axle, at least one of which is removable, said cones forming an inner race, non-friction bearing means between said inner and outer races, a bracket for supporting said axle, means for clamping said axle to said bracket, and a washer clamped between said cones and said bracket, the periphery of said washer being positioned adjacent said roller to form a lubrication seal.

5. In a trolley roller assembly, the combination with a trolley wheel having an axial recess forming an inner peripheral grooved bearing surface providing an outer race, of an axle for said roller extending into said recess and having a head forming an inner race, non-friction bearing means between said inner and outer races, a bracket for supporting said axle, means for clamping said axle to said bracket, and a washer clamped between said head and said bracket, a metal backed felt packing gland carried by said roller in the recess thereof adjacent said washer, said washer cooperating with said packing gland to form a lubrication seal.

6. An inner race assembly for a trolley roller comprising a pair of adjacent separable cones having cooperating bearing surfaces forming an inner race, and a grease seal ring formed integral with one of said cones.

7. In a trolley roller assembly, the combination with a trolley roller having an axial recess opening at one side thereof and closed by a wall at the other side thereof, said roller providing a one piece outer bearing race, of a shaft extending into said opening, an inner race carried on said shaft comprising separable cones, non-friction bearing means carried between said inner and outer races, a hanger through which said shaft extends, an annular washer positioned between said cones and said hanger, and means for closing the open side of said recess comprising an apertured ring carried by said roller having a central opening the edges of which are near said annular washer.

8. In a trolley roller assembly, the combination with a trolley wheel having an axial recess opening at one side and closed by a wall at the other side, said roller providing a one piece outer bearing race, of a shaft extending into said opening, an inner race carried on said shaft comprising separable cones, non-friction bearing means between said inner and outer races, a hanger through which said shaft extends, means for clamping said shaft on said hanger, and means for effecting a grease seal at the open side of said roller recess comprising a plurality of spaced stationary rings carried by said shaft and having their outer edges near the periphery of said recess, and extending thereinto.

9. In a trolley roller assembly, the combination with a trolley roller having an axial recess opening at one side thereof, said roller providing a one piece outer bearing race, of a shaft extending into said opening, an inner race carried on said shaft comprising separable cones, non-friction bearing means carried between said inner and outer races, a hanger through which said shaft extends, an annular washer positioned between said cones and said hanger, and an apertured ring carried by said roller having an opening through which said shaft extends and overlapping said washer, and means forming a grease seal for said axial recess opening including said annular washer and said ring.

ALEXIS W. LEMMON.